United States Patent
Lee et al.

(10) Patent No.: US 8,443,214 B2
(45) Date of Patent: *May 14, 2013

(54) METHOD AND SYSTEM FOR OPTIMIZING POWER CONSUMPTION IN A MOBILE ENVIRONMENT

(75) Inventors: Jonathan Lee, Dublin, CA (US); John Lenell, Newport Beach, CA (US); Gregory Youngblood, Santa Ana, CA (US)

(73) Assignee: Broadcom Corporation, Irvine, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 12/874,790

(22) Filed: Sep. 2, 2010

(65) Prior Publication Data

US 2010/0332866 A1   Dec. 30, 2010

Related U.S. Application Data

(63) Continuation of application No. 10/629,207, filed on Jul. 29, 2003, now Pat. No. 7,865,744.

(60) Provisional application No. 60/408,497, filed on Sep. 4, 2002.

(51) Int. Cl.
   *G06F 1/32*   (2006.01)
   *G06F 1/26*   (2006.01)

(52) U.S. Cl.
   USPC ........... 713/300; 713/310; 713/320; 713/321; 713/323; 713/324; 713/330; 713/340

(58) Field of Classification Search ............ 713/300, 713/310, 320–324, 330, 340
   See application file for complete search history.

(56) References Cited

U.S. PATENT DOCUMENTS

| | | | |
|---|---|---|---|
| 5,778,237 A * | 7/1998 | Yamamoto et al. | 713/322 |
| 6,795,450 B1 * | 9/2004 | Mills et al. | 370/463 |
| 7,340,615 B2 * | 3/2008 | Krantz et al. | 713/300 |
| 7,577,857 B1 * | 8/2009 | Henderson et al. | 713/320 |

* cited by examiner

*Primary Examiner* — Fahmida Rahman
(74) *Attorney, Agent, or Firm* — Thomas|Horstemeyer, LLP

(57) ABSTRACT

The present invention relates to a system and method adapted to optimize power consumption in a communication system used in a Gigabit Ethernet environment. The method comprises determining at least one power mode of a host from a plurality of possible host power modes. The method further comprises selecting at least one network interface power management state from a plurality of possible network interface power management states based, at least in part, on the determined power mode.

27 Claims, 8 Drawing Sheets

METHOD AND SYSTEM FOR OPTIMIZING POWER CONSUMPTION IN A MOBILE ENVIRONMENT

RELATED APPLICATIONS

This application is a continuation of U.S. patent application Ser. No. 10/629,207, filed Jul. 29, 2003, now U.S. Pat. No. 7,865,744 titled "System and Method for Optimizing Power Consumption in a Mobile Environment", which is related to, and claims benefit of and priority from, Provisional Application No. 60/408,497, filed Sep. 4, 2002, titled "Optimization For Power Consumption in a Mobile Environment", the complete subject matter of both applications are incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Embodiments of the present invention relate generally to a system and method for optimizing power consumption. More specifically, the present invention relates to a system and method for optimizing power consumption in a mobile environment (a mobile communication system for example).

High-speed digital communication networks over copper and optical fiber are used in many network communication applications. Ethernet and Fiber Channel are two widely used communication protocols, which continue to evolve in response to the increasing need for higher data rate and bandwidth in communication systems. As such data rate and bandwidth requirements increase, Gigabit Ethernet transmission rates are being developed and implemented in high-speed networks. Such Gigabit Ethernet transmissions provide higher performance for many business applications while maintaining backward compatibility with existing Ethernet networks.

The Open Systems Interconnection or OSI model (ISO standard) was developed to establish standardization for linking heterogeneous computer and communication systems. This model describes the flow of information from a software application of a first computer system to a software application of a second computer system through a network medium.

The OSI model has seven distinct functional layers including Layer 7: an application layer; Layer 6: a presentation layer; Layer 5: a session layer; Layer 4: a transport layer; Layer 3: a network layer; Layer 2: a data link layer; and Layer 1: a physical layer. Importantly, each OSI layer describes certain tasks which are necessary for facilitating the transfer of information through interfacing layers and ultimately through the network. Notwithstanding, the OSI model does not describe any particular implementation of the various layers.

OSI layers 1 to 4 generally handle network control, data transmission and reception. Layers 5 to 7 handle application issues. The specific functions of each layer may vary depending on such factors as protocol and interface requirements or specifications that are necessary for implementation of a particular layer. For example, the Ethernet protocol may provide collision detection and carrier sensing in the physical layer.

Layer 1, the physical layer (alternatively referred to as the "PHY"), is responsible for handling all electrical, optical, opto-electrical and mechanical requirements interface to the communication media. Notably, the physical layer may facilitate the transfer of electrical signals representing an information bitstream. The physical layer may also provide such services as encoding, decoding, synchronization, clock data recovery, and transmission and reception of bit streams. In high bandwidth applications, having transmission speeds of the order of Gigabits, high-speed electrical, optical and/or electro-optical transceivers may be used to implement this layer.

Gigabit Ethernet connections have grown dramatically, fueled by the inclusion of Gigabit Ethernet (alternatively referred to as "GbE") controllers in desktop PCs. It is contemplated that such transition to GbE is driven, at least in part, by the availability of single-chip GbE controllers at approximately the same price as existing Fast Ethernet controllers (i.e., 100 megabits/second (Mbps) Ethernet transmission).

In general, mainstream mobile PCs do not offer the same GbE connectivity provided by desktop PCs due to the high power dissipation, extensive heat generation and lack of power management associated with currently available GbE controllers. However, the development of economical, power-efficient GbE controllers may facilitate the adoption of such GbE technology in mobile PCs and contribute to overall Gigabit Ethernet shipment growth in both mobile and desktop PCs.

It is desirable to broaden market adoption of GbE by lowering system cost and increasing performance and reliability of GbE controllers, where some key factors for determining reliability include thermal dissipation and package design. It is further desirable to enable the transition of mobile PCs (along with desktop PCs) to the Gigabit Ethernet by reducing the power dissipation levels.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Embodiments of the present invention relate generally to a system and method for optimizing power consumption. More specifically, the present invention relates to a system and method for optimizing power consumption in a mobile environment (a mobile communication system for example). In one embodiment, the present invention is contemplated to have four times greater reliability than competing solutions. Exemplary embodiments of the present invention may enhance every aspect of the PC end-user experience by delivering higher networking performance, longer battery life, higher reliability and lower cost.

One embodiment of the present invention relates to a method adapted to optimize power consumption in a communication system comprising a network interface and a host computer. This embodiment comprises determining, by the network interface, at least one power mode of the host computer from a plurality of possible power modes, and selecting, by the network interface, at least one network interface power management state from a plurality of possible power management based on the at least one power mode determined.

Another embodiment of the present invention relates to a method adapted to optimize power consumption in a communication system used in a Gigabit Ethernet environment. This method comprises determining at least one power mode of a host from a plurality of possible host power modes. At least one network interface power management state is selected from a plurality of possible network interface power management states based, at least in part, on the determined at least one power mode. Still another embodiment of the present invention relates to a method adapted to optimize power consumption in a communication system used in a Gigabit Ethernet environment. This embodiment comprises determining at least one of a first or full on power mode, a second or stationary power mode or a third or travel power mode. The method further comprises selecting at least one network interface power management state, based at least in part on the determined power mode.

Yet another embodiment of the present invention relates to a method adapted to optimize power consumption in a communication system used in a Gigabit Ethernet environment. This embodiment comprises determining a host power mode, then operating in a first or full on power management state, a second power management state, a third power management state or a fourth or low power management state based on the determined host power mode.

Another embodiment relates to a system adapted to optimize power consumption in a communication system used in a Gigabit Ethernet environment. This embodiment comprises a PHY adapted to detect at least one host power mode from a plurality of possible host power modes, and select, based on the host power mode detected, at least one power management state from a plurality of power management states for operation of the system.

One embodiment of the present invention relates to a method for optimizing power in a communication system. This embodiment comprises detecting at least one of an amount of traffic, a link, an absence of AC power and a power state of the communication system. At least one power management state is selected from a plurality of power management states based, at least in part, on such detection. In another embodiment, power (i.e., power consumption) in the communication is scaled in relationship to the detected amount of traffic.

These and other advantages, aspects and novel features of the present invention, as well as details of an illustrated embodiment thereof, will be more fully understood from the following description and drawings.

DETAILED DESCRIPTION OF THE INVENTION

Figure 1:
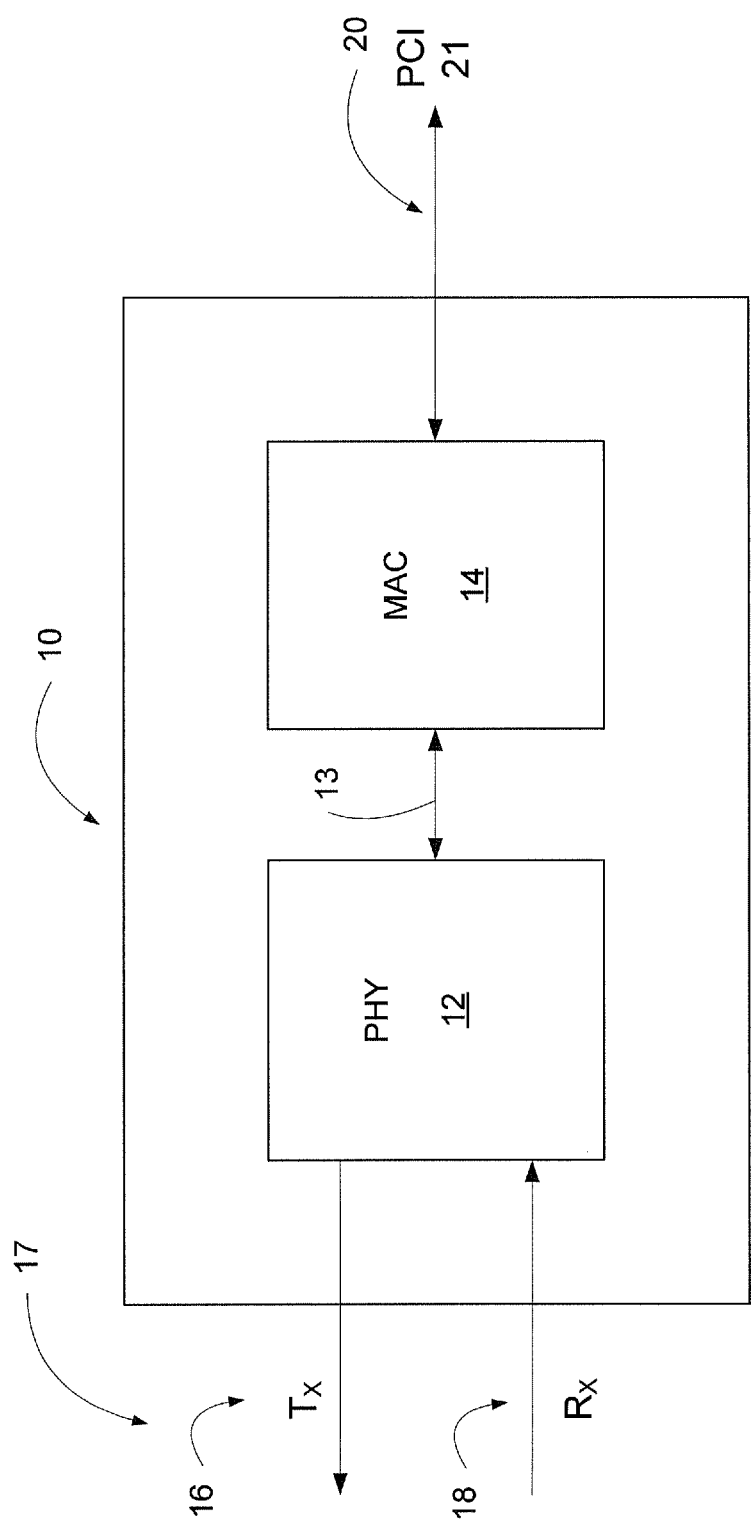
FIG. 1 illustrates an embodiment of a block diagram of device in accordance with the present invention.

One embodiment of the present invention relates to system and method for optimizing power consumption in a network environment (a mobile network environment for example). Exemplary embodiments of the present invention may enhance the PC end-user's experience by delivering high networking performance, prolonging battery life, providing high reliability and low cost. Such exemplary embodiments may reduce power consumption in the PC to about 900 mW in some applications, approximately half the power consumed by currently available solutions. Such power reduction may provide exemplary GbE controllers with up to approximately four times greater reliability than currently available controllers. More specifically, exemplary embodiments of the present invention enable the transition of PCs (mobile or laptop PCs for example) to Gigabit Ethernet by reducing the equivalent power dissipation to levels even lower than those associated with known 10/100 Fast Ethernet solutions.

One embodiment of the present invention comprises a device adapted to communicate with a driver or controller (a 32-bit PCI controller used in mobile applications via a PCI bus for example). An exemplary embodiment of the device reduces power consumption to approximately 900 mW in some applications. When operating under the same conditions, such exemplary embodiment of the controller may consume approximately 40% less power than currently available 10/100 Fast Ethernet solutions, and approximately 50% less power than currently available Gigabit solutions running at 1000 Mbps. In addition, exemplary embodiments of the present invention sense the performance requirements of the mobile PCs, reducing the power levels intelligently and automatically. This may result in a dramatic extension of the PC battery life. In addition, lower overall power consumption enables better thermal performance—a key factor in mobile PC design. Furthermore, exemplary embodiments of the present invention may provide a solution for single-chip Gigabit Ethernet network interface card (alternatively referred to as a "NIC") and high volume LANs on Motherboard (alternatively referred to as "LOM") applications. It is also contemplated that the device may provide interfaces for mobile applications such as PCI v2.2, MiniPCI and Cardbus form factors.

Another embodiment of the present invention comprises a device adapted to communicate with a driver or controller (a 32-bit PCI controller used in desktop and workstation PCs for example). Exemplary embodiments of the present invention may provide up to about 341% performance improvement over current 10/100 Ethernet connections used in everyday business applications, while reducing the time to perform routine maintenance operations by up to two-thirds.

It is also contemplated that one embodiment of the present invention is adapted to be used in both mobile and desktop applications. In this embodiment, the device is adapted to be used with mobile PC applications and desktop applications.

One feature of an exemplary embodiment of the present invention relates to efficient power management. Such exemplary embodiments of the present invention are adapted to support one or more device power states (i.e., lower power modes) that are undetectable by the user, including D0, D1, D2, D3 hot, and D3 cold power management states. For example, in one embodiment the device may be in the off state, even though the larger system (i.e., the mobile PC for example) is in a working state. It is contemplated that one embodiment of the present invention may comprise implementing one or more power management states, alone or in combination with one or more of the device power states.

It should be appreciated that the terms first, full-on, second, stationary, third, travel, fourth and lower power are designations used for discussion purposes only. These terms are assigned to distinguish between different power modes and states and do not otherwise limit the embodiments of the present invention.

FIG. 1 illustrates a block diagram of a device, generally designated 10 in accordance with one embodiment of the present invention. In this embodiment, the device 10 comprises at least a PHY 12 (a 10/100/1000 Base-T PHY for example) and a media access controller 14 (alternatively referred to as "MAC"), (a 10/100/1000 Base-T MAC for example). In one embodiment of the present invention, the physical layer or PHY 12 comprises a single-chip multi-sublayer PHY (alternatively referred to as "PHY", "gigabit PHY" or "GPHY"), although other devices and embodiments are contemplated. In one embodiment, the PHY 12 is fully compatible with at least the IEEE 802.3 standard for auto-negotiation of speed, while the MAC 14 is, for example, a triple speed IEEE 802.3 compliant MAC.

In the illustrated embodiment, the MAC 14 is coupled to and interfaces with the PHY 12 through at least one connection or interface 13. In general, the MAC 14 comprises at least one sublayer of a data link control layer that shares the physical connection to a network among several upper-level systems. The single-chip multi-sublayer PHY 12 may interface to a gigabit network (not shown) through a transmit and receive interface or link 17. In one embodiment, the transmit and receive interface 17 comprises 1 Gigabit serial transmit and receive interfaces 16 and 18 respectively. The MAC 14 communicates with a PCI device or controller 21 using PCI bus or interface 20. Other embodiments of the device are contemplated which, in addition to the PHY 12 and MAC 14, may include at least one of a processor, a PLL, a memory, a memory controller, a buffer memory and a PCI. Furthermore, it is contemplated that the present invention may comprises a single-chip Gigabit Ethernet NIC or LOM solution.

It is contemplated that communication devices may operate or exist in any one time in one of a plurality of possible power modes. For the purposes of the present invention, four exemplary power modes are discussed, although other or a differing number of modes are contemplated. In a first or full-on power mode, the communication device is transmitting and/or receiving a large amount of traffic, requiring a large amount of bandwidth (1000 Base-T which is a Gigabit transmission of 1000 Mbps for example).

A second or stationary power mode exists in which the device has achieved link but the system is powered by DC or battery power for example. A third or travel power mode exists comprising no link and the system is powered on DC power. A fourth or low power mode exists in which the system is a sleep or hibernate state and no usage is possible. The communication device enters into a low power state.

One embodiment of the present invention relates to detecting at least one power mode from a plurality of possible modes in which a communicating device is operating. A power management feature is implemented in response to such detected power mode, optimizing the power consumption of the communication device. In one embodiment, one power management state is selected from a plurality of possible power management states to operate the communication device, optimizing the power consumption of the device. In such embodiment, the device 10 may detect at least one of an amount of traffic, the existence of a link (i.e., transmit/receive interface), the absence of A/C power, and/or the power state of the PC, and determine what power management state in which to place or operate the device and/or communication system.

Figure 2:
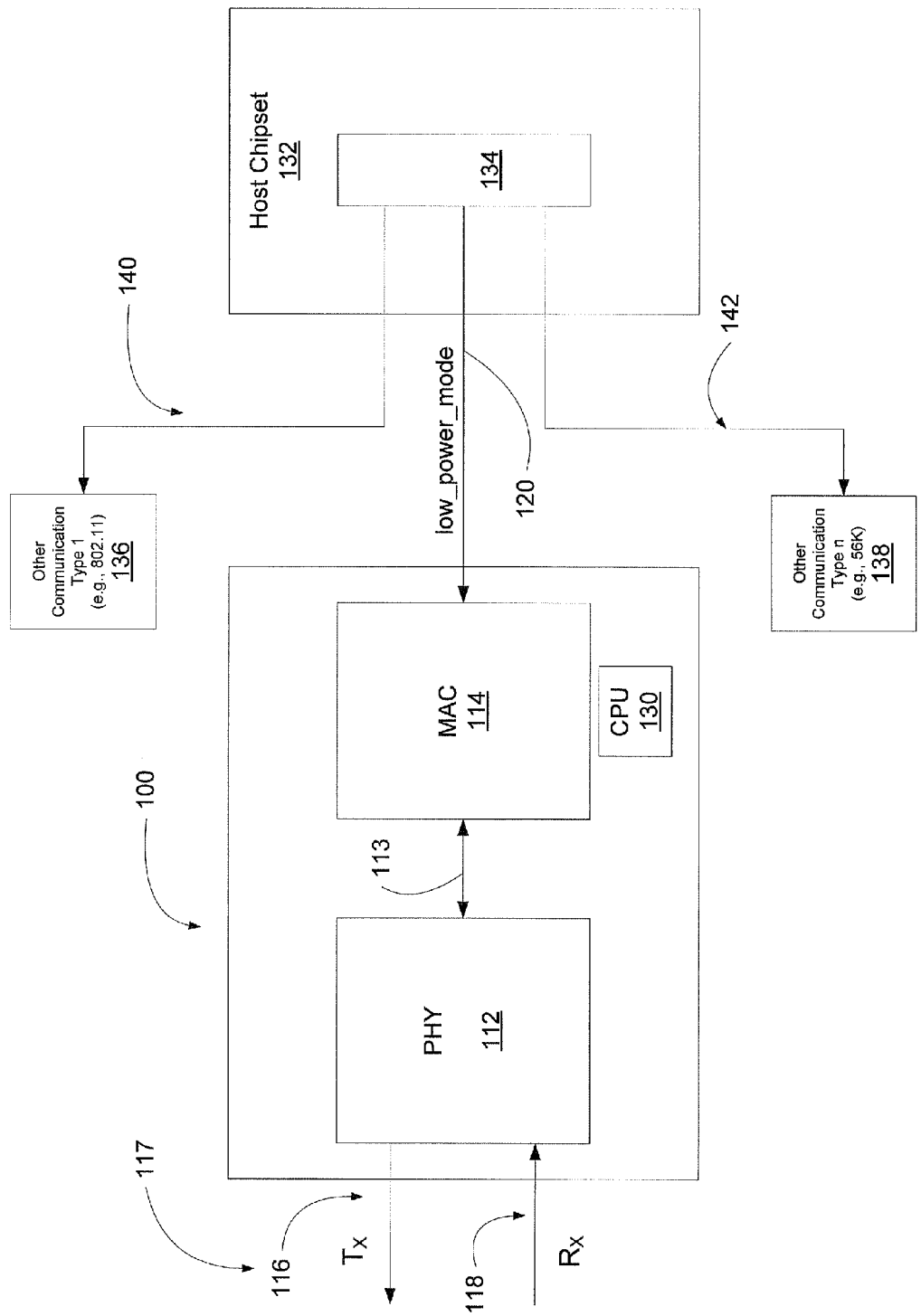
FIG. 2 illustrates an embodiment of a block diagram of a device similar to that of FIG. 1 communicating with a host chipset in accordance with the present invention.

FIG. 2 illustrates a block diagram of a device, generally designated 100, in accordance with one embodiment of the present invention. The device 100, similar to device 10 discussed previously, is adapted to monitor at least the communication traffic, AC power or some combination of the two, of a communication device (a mobile or desktop PC for example) and then determine what state, from a plurality of possible states, the communication device should be placed or operate in to optimize power consumption. In this embodiment, the device 100 comprises, for example, at least a PHY 112 and a MAC 114 (a CPU 130 is also illustrated). In one embodiment of the present invention, the physical layer or PHY 112 comprises a single-chip multi-sublayer PHY, although other interfaces and embodiments are contemplated.

In the illustrated embodiment, the MAC 114 interfaces with the PHY 112 through at least one interface 113. In this embodiment, the single-chip multi-sublayer PHY 112 interfaces to a Gigabit network (not shown) through a transmit and receive interface (or link) 117. In one embodiment, the transmit and receive interface 117 comprises 1 Gigabit serial transmit and receive interfaces 116 and 118 respectively. Further, the MAC 114 communicates with a host chipset 132, having at least the host processor 134, using PCI bus or interface 120. In one embodiment, the host processor 134 is the PCI driver.

It is contemplated that, in addition to communicating with the device 100, the host chipset 132 may communicate with one or more communication devices or types (ranging in number from 1 through n). In this illustrated embodiment, the host chipset 132 is shown coupled to and communicating with another communication device type 1, generally designated 136 (a network communication device for example) using interface 140 and another communication type n, generally designated 138 (a 56 k modem for example) using interface 142.

In accordance with one embodiment of the present invention, the device 100 is adapted to detect that the communication device is transmitting a large amount of traffic, requiring a large amount of bandwidth (1000 Base-T, which is a gigabit transmission of 1000 Mbs for example). In other words, the present invention operates the communication device in a first or full-on power management state, operating the MAC 114 at 62.5 MHz for example, the frequency used to support such high bandwidth. Typically, in such full-on power management state the communication device consumes approximately one 900 mW of power.

One embodiment of the present invention is further adapted to detect a second or stationary power mode from a plurality of possible power modes. In this embodiment, the device 100 is adapted to detect at least the absence of AC power (i.e., the system is DC powered) and/or the device has achieved link 117. The device 100 selects the second or stationary power management state from the plurality of possible power management states, using polling for example. In other words, the device 100 detects the absence of AC power and automatically operates the communication device in the second power management state using polling for example.

More specifically, upon detecting the absence of AC power (i.e., detecting that the communication system is running on a battery), the device configures the GPHY 112 to start/restart auto-negotiation at a predetermined speed, approximately 10 Base-T for example or 10 Megabits/second (about 100 times slower than the full-on management state). The device continues to restart auto-negotiation, incrementing the advertised capabilities for each restart until the link presence is detected. If the device 100 detects a link presence at a speed of 10 Base-T, the device changes or slows the core clock speed (i.e., the core clock of the MAC) to achieve the desired low power mode. In one embodiment, the device configures the clock control register to slow the core clock down to 6.25 MHz for example, which is approximately one-tenth the processing speed required during the first power management state. In at least one other embodiment, the device detects the amount of traffic and scales the power in accordance with or related to the amount of traffic. In this second power management state, the device consumes about 165 mW of power, a power savings of about 80% as compared to the full-on power management state.

One embodiment of the present invention is further adapted to detect a third or travel power mode from a plurality of possible power modes. In this embodiment, the device 100 is adapted to detect at least the absence of traffic on the link (e.g., the device 100 detects the absence of AC power). The device selects the third or travel power management state from the plurality of possible power management states, using polling for example. In this embodiment, upon detecting no the link and/or DC power, the PHY 112 enters into a power up on activity state, whereby the PHY 112 stays in a low power state until energy or traffic is detected on the link. In this power management state, the PHY 112 periodically transmits link pulses and detects energy on the link. It is contemplated that in this power management state, the GPHY 112 continues to drive the MII transmit and receive clock to the MAC 114. Upon detecting energy no the link, the GPHY 112 exits the low power state. In other words, in the third power management state, the link usage is low or zero, and the throughput is lowered from approximately 1000 Base-T to approximately none or no throughput (i.e., approximately 0).

The handshake between the PHY 112 and MAC 114 controls when to switch to a slow clock (i.e., a 6.25 MHz clock for example) and power down a PLL (not shown). In this embodiment, the PHY 112 drives an iddq_dll_act signal high. This high iddq_dll_act signal causes the MAC 114 core to switch (i.e., change or slow) to a 6.25 MHz core clock. After the core clock slows down, the MAC 114 asserts the iddq_dll_en signal back to the PHY 112, enabling the PHY 112 to auto power down the PLL. When the link is re-established, the iddq_dll_act signal is driven low. The MAC 114 waits approximately 40 µs is after the iddq_dll_act signal is driven low, then switches back to the 62.5 MHz core clock, deasserting the ddq_dll_en. The PHYCORE ANDs the iddq_dll_en signal with the iddq_dll signal from the PHY 112, connecting the output to the PLL.

Figure 3:
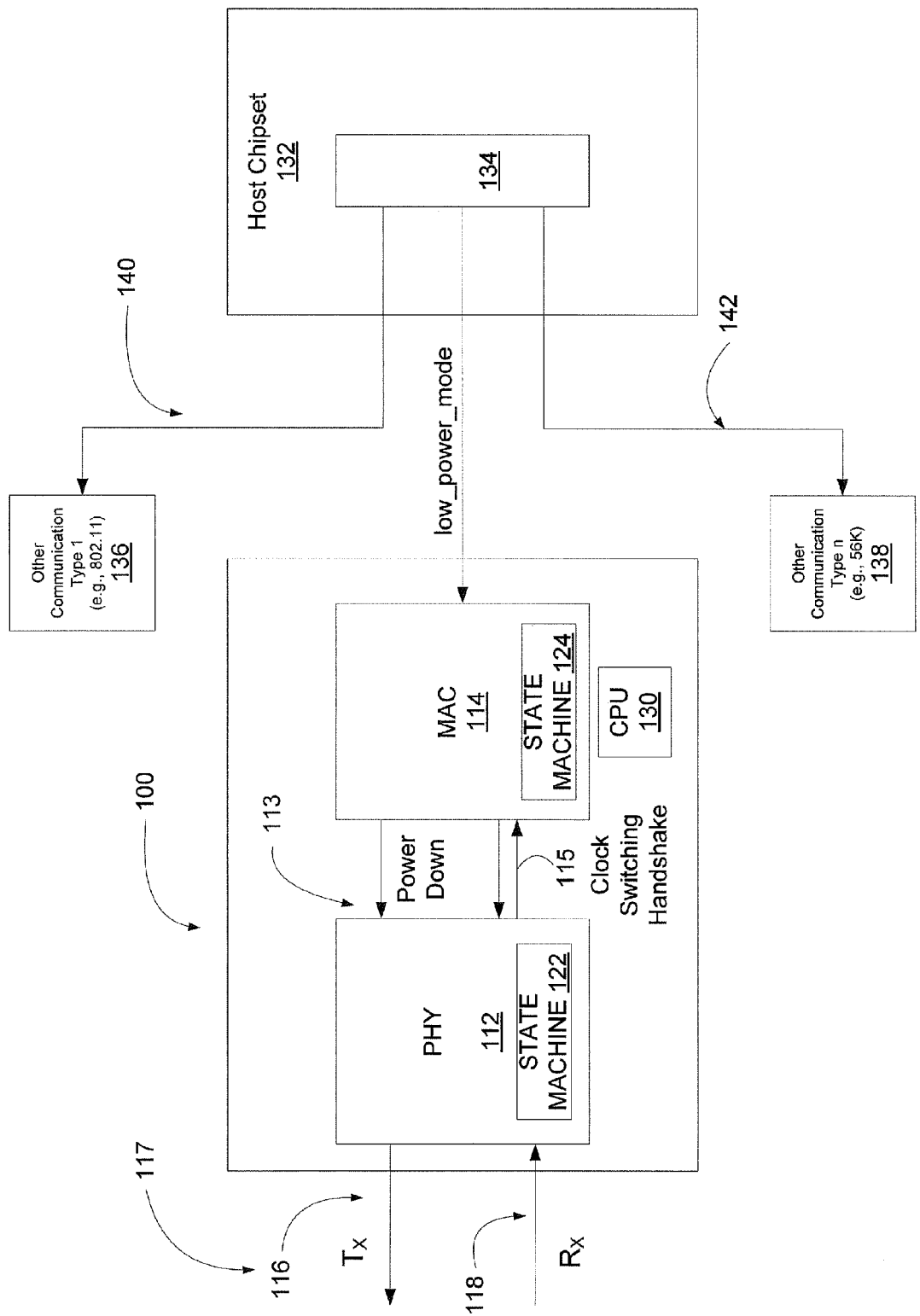
FIG. 3 illustrates an embodiment of a block diagram of a device similar to that of FIG. 1 in a power down mode in accordance with the present invention.

It is contemplated that, in accordance with the presence invention, the link may be powered down using the device 100. FIG. 3 illustrates a block diagram of an embodiment of a device 100, similar to that illustrated in FIG. 2, illustrating powering down the link in accordance with one embodiment of the present invention. For example, the link may be powered down in the third mode due to a loss of signal on the link 117. In this mode, the third mode, the device 100 performs the power down (i.e., the power down is hardware driven using state machines 122 and 124). Upon detecting the loss of signal on the link 117 and DC power, the device 100 performs clock switching handshake (i.e., a clock switching handshake signal 115 is transmitted between PHY 112 and the MAC 114 for example) similar to that described previously.

It may also be necessary to purposefully power down the link 117. For example, the host processor 134 may desire to communicate with another type of communication device, a 56K modem (communication device 138) for example. In this example, device 100 is not used and no information is communicated over the link 117. Therefore, it is desirable to power down the device 100 and link 117. It is also contemplated that the communication device may be used in a local area network for example. In this embodiment, the device 100 may be reset or rebooted (i.e., a self trigger hot reset) by powering down the device 100. Additionally, it may be necessary to power down the device 100 prior to removing it from the communication device. In an exemplary embodiment, the device 100 is operated or placed in a fourth or low power management state.

As provided previously, device 100 is adapted to operate in a fourth power management state. In this embodiment, the device 100 selects the fourth power management state from a plurality of power management states. It is contemplated that the fourth power management state is pin driven by the MAC 114. That is the device 100 (specifically the MAC 114) has at least one pin, a low power management pin, which is adapted to shut down the device 100 (i.e., the device 100 is non-functional) even though one or more portions of the communication device may remain up or functional. While a fourth power management pin is discussed, other embodiments for powering down the device 100 are contemplated.

In this fourth power management state, the device 100 is powered down using power down signal, in one embodiment at least one, more or all clocks are stopped and the one or more I/O pads are tri-stated. More specifically, the device 100 (specifically MAC 114) defines a new pin "Low_PWR_Mode" enabling the device 100 to be optionally powered down. When Low_PWR_Mode pin is asserted, the device 100 is put in IDDQ state, which draws 6 mA of current. Upon the deassertion of Low_PWR_Mode pin, the device 100 executes a hard reset. It is contemplated that in this embodiment, the device can not transmit nor receive nor respond to PCI transactions.

It is also contemplated that one embodiment of the present invention may include an uninitialized state used to meet power budget requirements of the mini-PCI and Cardbus cards. The Cardbus and Mini-PCI cards allow a power budget of only 70 mA for the D0 uninitialized state. However, the PHY alone draws 54 mA of current even at 10 Base-T with 0% traffic. In order to meet such power requirements, the PHY may be powered up in the fourth power management state and include one or more pieces of firmware selectively adapted to enable the GPHY to provide out of box (alternatively referred to as "OOB"), exceeding the power management budget. The GPHY is enabled for operation when the "memory map enable" bit is set in the command register. Setting the memory map enable bit tells the device 100 that it is no longer in the D0 uninitialized state. The firmware detects the setting of the bit and configures the GPHY for auto-negotiation. The device 100 provides a "memory map enable" change state interrupt to the internal CPU 130. In this embodiment, the MAC 114 starts up with a slow core clock speed. Once it is detected to be out of D0 uninitialized state, MAC 114 powers up the GPHY 112, waits for 40 µs, then switches to the 62.5 MHz clock.

It is further contemplated that one or more embodiments of the present invention may support Out Of Box WOL. In this embodiment, the device 100 and communication device consume minimal power while on auxiliary power source. For example, during a hard reset, if no PCI main power is detected (i.e., PCIVDDO is absent), one embodiment of the present invention configures the GPHY 112 to auto-negotiate to 10/100 only, for example. This enables the system to wake up from magic packet without drawing too much auxiliary power. The missing main power is detected by checking the level of the reset output from the 3.3V PCIVDDO POR213 circuit. If the VDDO_PCI_rsb is low, then PCIVDDO is absent.

In another embodiment, the present invention manages power for the PCI mode, reducing current to less than approximately 375 mA when main power is lost but Vaux is present and the power management register has not been set to the D3 device power management state, enabling the device 100 to reduce the chip power. This may occur when the driver is not loaded and some OSes do not touch the PMSCR register. The present invention may use the PCIVDDO POR213 circuit to detect the absence of main power and set the PMSCR power state register to D0, triggering a hard reset. This hard reset sets the PHY 112 back into the 10/100 mode and OOB WOL state. The loss of power detection circuit is an edge detection on the loss of power, so that the device isn't always reset when main power is absent.

Figure 4:
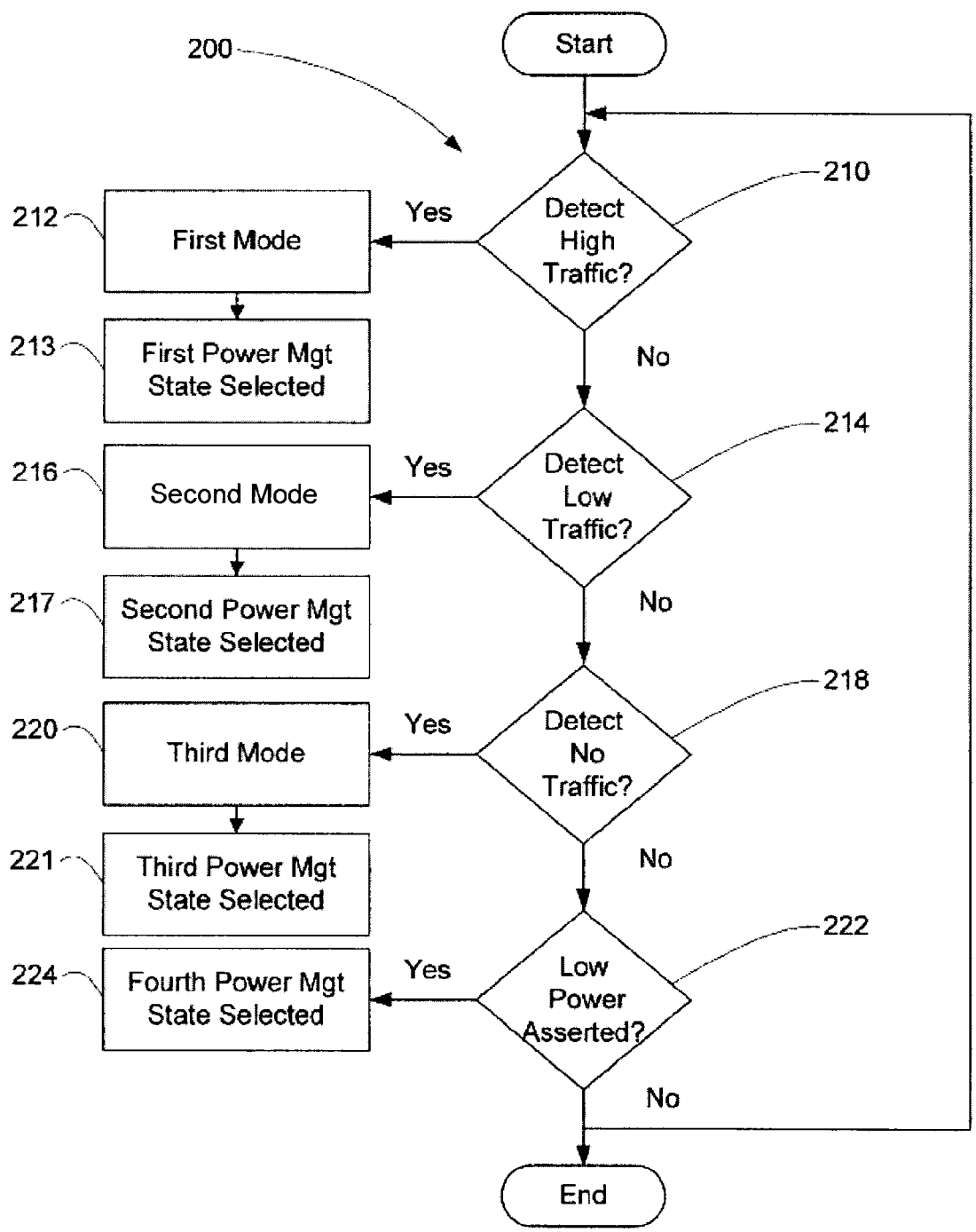
FIG. 4 illustrates an embodiment of a high level flow chart depicting one method of optimizing power consumption in accordance with the present invention.
Figure 5A:
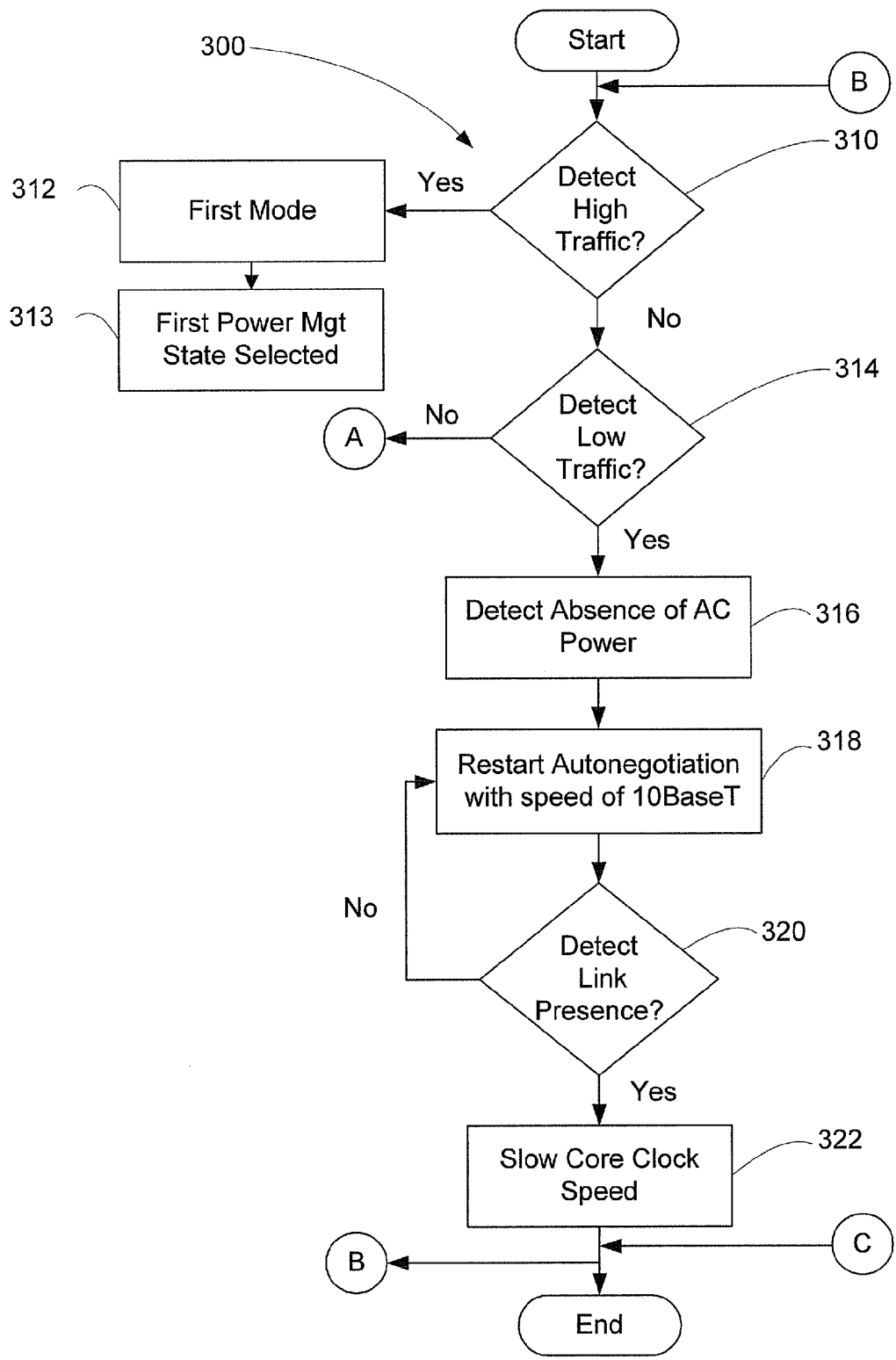
FIGS. 5A, 5B, 5C and 5D illustrate an embodiment of a detailed flow chart depicting one method of optimizing power consumption in accordance with the present invention.
Figure 5B:
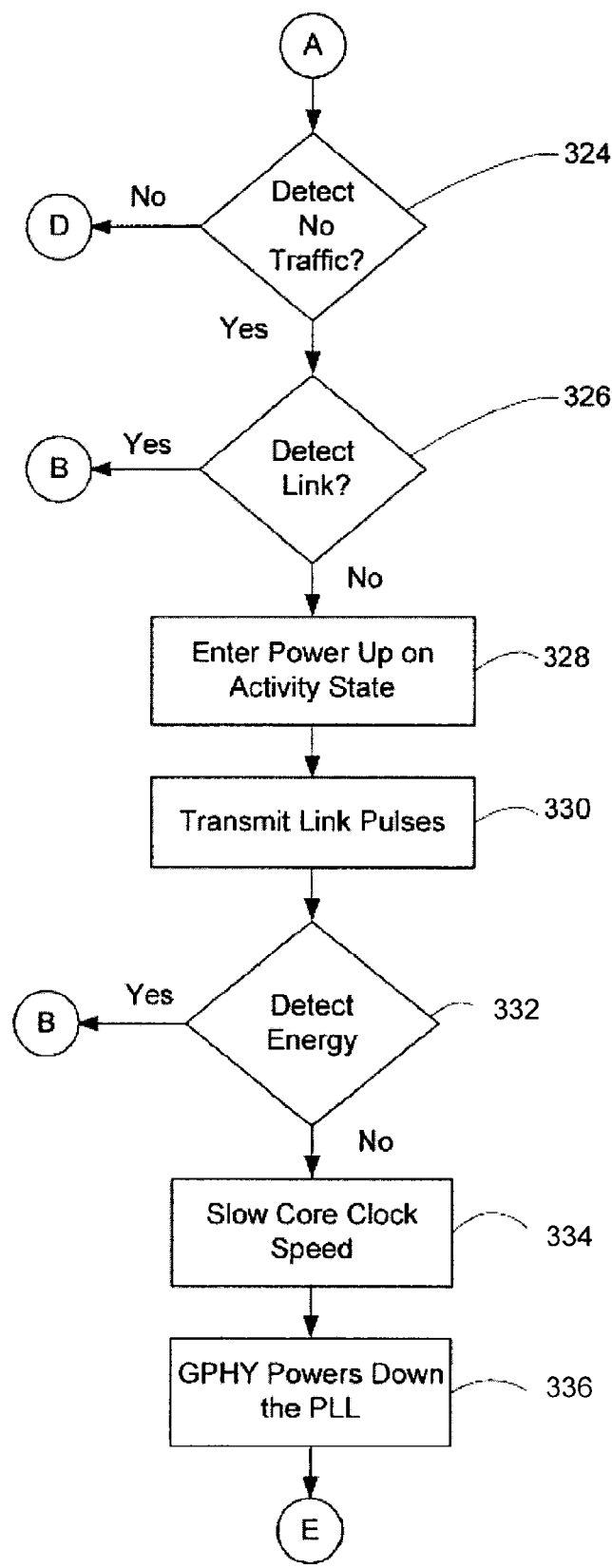
Figure 5C:
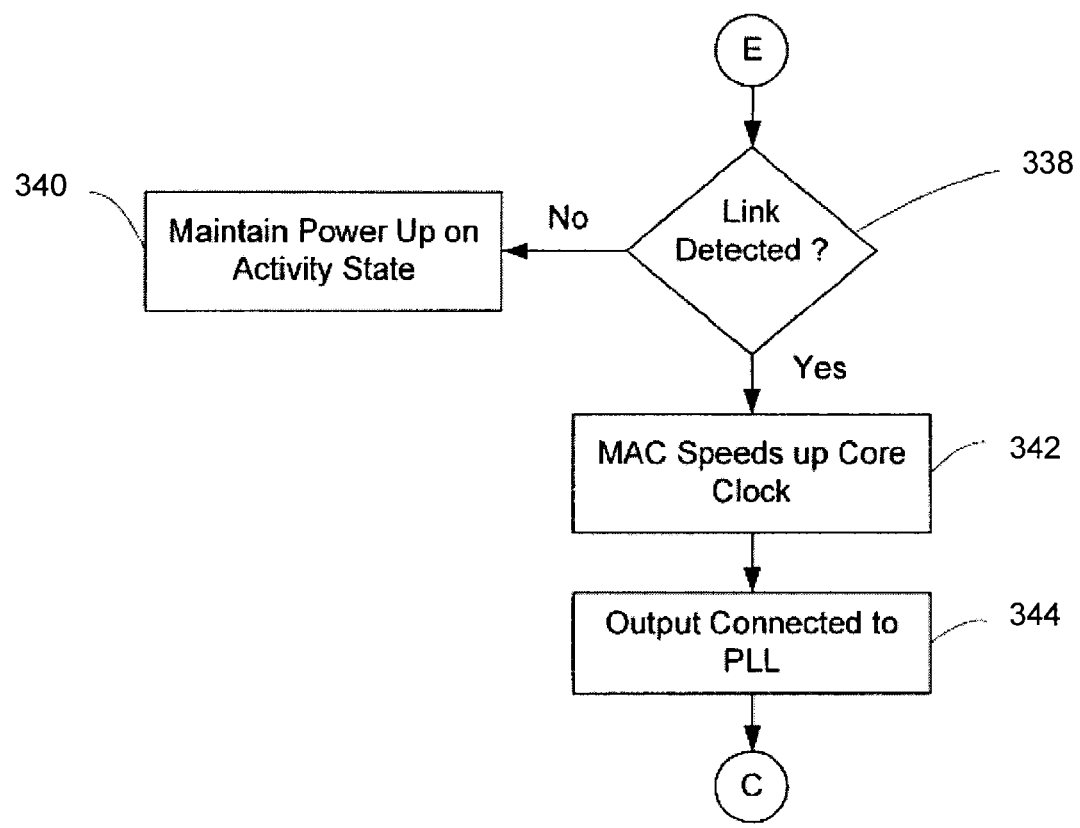
Figure 5D:
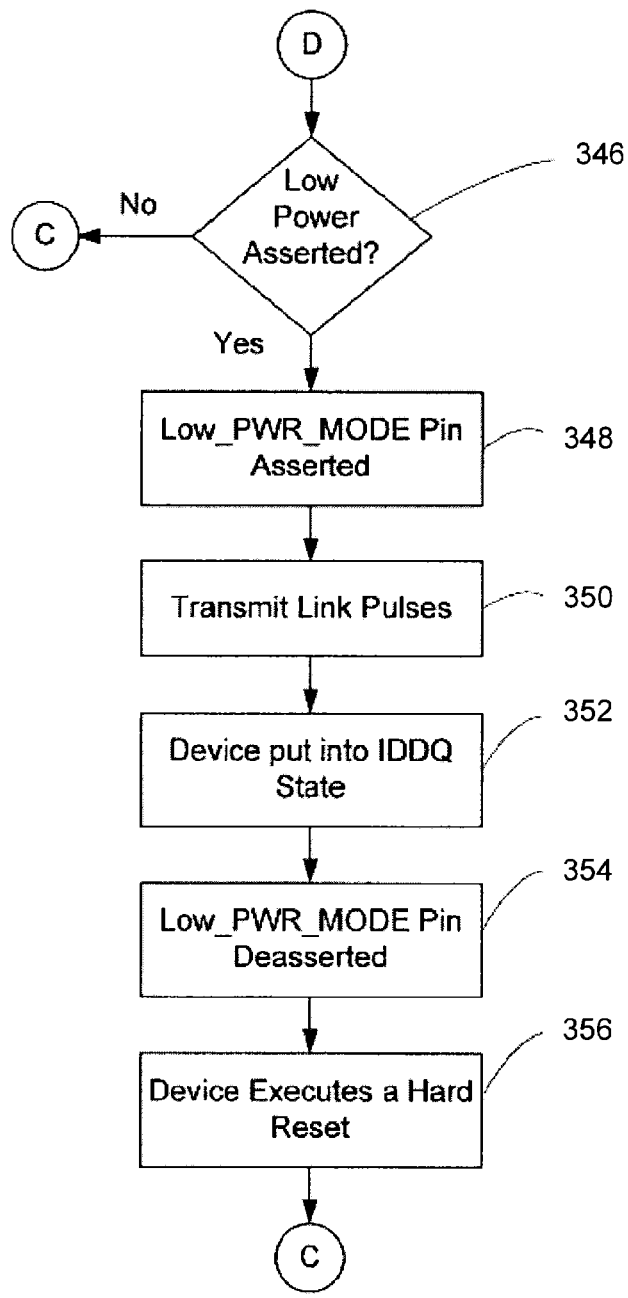

FIG. 4 illustrates an embodiment of a high level flow chart depicting a method, generally designated 200, for optimizing power consumption in accordance with the present invention. For example, this method may be used to optimize power consumption in a communication device (a mobile or desktop PC for example) used in an Ethernet environment (specifically a Gigabit Ethernet environment) by maximizing power consumption of a power device (i.e., a battery for example). Method 200 determines if high traffic is detectable (on a link for example) as illustrated by diamond 210. In one embodiment, the method uses a device comprising at least a GPHY to detect such high traffic. If high traffic is detected, the method determines that the system is in a first mode as illustrated by block 212. A first power management state is selected as illustrated by block 213, optimizing power consumption.

If high traffic is not detected, method 200 determines if low traffic/and or the absence of AC power is detected as illustrated by diamond 214. If such low traffic is detected and/or AC power is not detected, the method determines that the system is in a second mode as illustrated by block 216. The system operates the power device in second power management state as illustrated by block 217. If the low traffic is not detected, one embodiment of the present invention determines if no traffic is detectable as illustrated by diamond 218. If no traffic is detected, the method determines that the system is in a third mode as illustrated by block 220. A third or travel power management state is selected as illustrated by block 221, optimizing power consumption.

It is further contemplated that, in one embodiment, the method 200 may detect if a fourth power mode is asserted (i.e., manually powering down, sleep mode, etc.) as illustrated by diamond 222. If such fourth power mode is asserted, then the fourth power management state is selected (i.e., the communication device is operated in a low power management state) as illustrated by block 224.

FIGS. 5A, 5B, 5C and 5D illustrate an embodiment of a flow chart depicting a method, generally designated 300, for optimizing power consumption in accordance with the present invention. Again, this method may be used to optimize power consumption in a communication device (a mobile or desktop PC for example) used in a Gigabit Ethernet environment) by maximizing power consumption of the communication device. Method 300 determines if high traffic is detected (on a link for example) as illustrated by diamond 310. In one embodiment, the method uses the GPHY to detect such high traffic. If high traffic is detected, method 300 determines that the system is in a first mode as illustrated by block 312. A first power management state is selected as illustrated by block 313, optimizing power consumption.

If high traffic is not detected, method 300 determines if low traffic is detected as illustrated by diamond 314. If such low traffic is detected, the method determines that the system is in a second mode and selects the second power management state. This may comprise determining if the absence of AC power is detected as illustrated by block 316. Method 300 starts/restarts auto-negotiation with a speed of 10 Base-T as illustrated by block 318, then determines if a signal on the link is detected as illustrated by diamond 320. If the signal on the link is not detected, method 300 starts/restarts auto-negotiation 318. If a signal is detected, the core clock speed (of the MAC for example) is slowed as illustrated by block 322.

If low traffic is not detected as illustrated by diamond 314, method 300 determines if no traffic is detected as illustrated by diamond 324. If no traffic is detected, the method determines if the link is detected as illustrated by diamond 326 of FIG. 5B. If the link is not detected, the method 300 determines that the system is in a third mode. A third power management state is selected, optimizing power consumption. This comprises entering a power up on activity state and transmitting one or more link pulses as illustrated by blocks 328 and 330, respectively.

Method 300 then determines if energy is detected as illustrated by diamond 332. If energy is detected, method 300 determines if high traffic is detectable (310 of FIG. 5A). If it is not detected, the core clock speed is slowed as illustrated by block 334. The GPHY powers down the PLL as illustrated by block 336. The method then determines if the link is detected as illustrated by diamond 338 of FIG. 5C. If the link isn't detected, power up on activity state is maintained as illustrated by block 340. If link is detected, the MAC core clock is sped up as illustrated by block 342, and the output is connected to the PLL as illustrated by block 344.

It is further contemplated that, in one embodiment, the method 300 may detect if fourth power mode is asserted (i.e., manually powering down, sleep mode, etc.). Detecting the assertion of the fourth power mode comprises determining if the low power is asserted as illustrated by diamond 346 of FIG. 5D. This comprises asserting the Low_PWR_Mode Pin is asserted as illustrated by block 348. One more link pulses are transmitted as illustrated by block 350 and the device is put into an IDDQ state as illustrated by block 352. When the Low_PWR_Mode Pin is deasserted as illustrated by block 354, the device executes a hard reset as illustrated by block 356.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for optimizing power consumption in a communication system comprising a network interface and a host computer, the method comprising:

determining, by the network interface, a power mode of the host computer from a plurality of possible power modes; and selecting, by the network interface, a network interface power management state from a plurality of possible network interface power management states based on the determined power mode, wherein selecting further comprises responsive to determining that the communication system is operating in a battery power mode, configuring a physical (PHY) layer module to perform auto-negotiation and increment advertised capabilities until link presence is detected, wherein the network interface provides access for the host computer to the network, and wherein the network interface locally selects the network interface power management state from the plurality of possible network interface power management states based at least in part on a volume of traffic received by the network interface, wherein said power consumption is scaled in relationship to an amount of traffic detected by said network interface.

2. The method of claim 1 wherein said plurality of possible power modes comprise at least one of a first, second and third power modes.

3. The method of claim 1 wherein said plurality of possible power modes comprises at least a fourth power mode.

4. The method of claim 1 wherein said plurality of possible network interface power management states comprises at least one of a first, second and third network interface power management states.

5. The method of claim 1 wherein said plurality of possible network interface power management states comprises at least a fourth network interface power management state.

6. The method of claim 1 wherein determining said power mode comprises determining at least one network interface power management state from the plurality of possible network interface power management states.

7. The method of claim 1 wherein determining said power mode comprises detecting at least one of an absence of A/C power, an amount of communication traffic, a link and a power state.

8. The method of claim 1 comprising operating the communication system at a frequency supporting high bandwidth transmission.

9. The method of claim 8 comprising operating at least a portion of the communication system at 62.5 MHz.

10. The method of claim 1, comprising reducing a throughput of the communication system.

11. The method of claim 10 comprising reducing the throughput of the communication system from about 1000 Base-T to about 10 Base-T.

12. The method of claim 1 comprising switching to a slow clock during at least one network interface power management state.

13. The method of claim 12 comprising switching to a 6.25 MHz clock.

14. A method for optimizing power consumption in a communication system used in a Gigabit Ethernet environment comprising:
determining, by a network interface, a power mode of a host from a plurality of possible host power modes; and
selecting, by the network interface, a network interface power management state from a plurality of possible network interface power management states based, at least in part, on said determined power mode, wherein selecting further comprises responsive to determining that the communication system is operating in a battery power mode, configuring a physical (PHY) layer module to perform auto-negotiation and increment advertised capabilities until link presence is detected,
wherein the network interface locally selects the network interface power management state from the plurality of possible network interface power management states based at least in part on a volume of traffic received by the network interface, wherein said power consumption is scaled in relationship to an amount of traffic detected by said network interface.

15. The method of claim 14 wherein said plurality of possible power modes comprise at least one of a first, second and third power modes.

16. The method of claim 14 wherein said plurality of possible network interface power management states comprises at least one of a first, second, third and fourth network interface power management states.

17. The method of claim 14 comprising operating the communication system at a frequency supporting high bandwidth transmission.

18. The method of claim 17 comprising operating at least a portion of the communication's system at 62.5 MHz.

19. The method of claim 14 comprising switching to a slow clock during at least one network interface power management state.

20. The method of claim 19 comprising switching to a 6.25 MHz clock.

21. The method of claim 14 comprising reducing a throughput of the communication system.

22. The method of claim 21, comprising reducing the throughput of the communication system from about 1000 Base T to approximately zero throughput.

23. A method for optimizing power consumption in a communication system used in a Gigabit Ethernet environment comprising:
determining, by a network interface, whether a host is operating in one of the group consisting of a full-on power mode, a battery power mode, and a travel power mode; and
selecting a network interface power management state, based at least in part on said determined power mode, wherein selecting further comprises responsive to determining that the communication system is operating in the battery power mode, configuring a physical (PHY) layer module to perform auto-negotiation and increment advertised capabilities until link presence is detected,
wherein the network interface locally selects the network interface power management state from a plurality of possible network interface power management states based at least in part on a volume of traffic received by the network interface, wherein said power consumption is scaled in relationship to an amount of traffic detected by said network interface.

24. A method for optimizing power consumption in a communication system used in a Gigabit Ethernet environment comprising:
determining, by a network interface, a host power mode; and
selecting one of a first, second, third and fourth network interface power management states based on said determined host power mode, wherein selecting further comprises responsive to determining that the communication system is operating in a battery power mode, configuring a physical (PHY) layer module to perform auto-negotiation and increment advertised capabilities until link presence is detected,
wherein the network interface locally selects the network interface power management state from a plurality of possible network interface power management states based at least in part on a volume of traffic received by the network interface, wherein said power consumption is scaled in relationship to an amount of traffic detected by said network interface.

25. A method for optimizing power consumption in a communication system comprising:
detecting, by a network interface, one of an amount of traffic, a link, an absence of AC power and a power state of the communication system; and
selecting at least one network interface power management state from a plurality of network interface power management states based at least in part in said detection, wherein selecting further comprises responsive to determining that the communication system is operating in an absence of AC power, configuring a physical (PHY)

layer module to perform auto-negotiation and increment advertised capabilities until link presence is detected,
wherein the network interface locally selects the network interface power management state from the plurality of network interface power management states based at least in part on a volume of traffic received by the network interface, wherein said power consumption is scaled in relationship to said detected amount of traffic.

26. An interface card for optimizing power consumption in a communication system used in a Gigabit Ethernet environment comprising:
   a PHY module adapted to detect a host power mode from a plurality of possible host power modes, and select, based on the host power mode detected, a network interface power management state from a plurality of network interface power management states for operation of the system, wherein selecting further comprises responsive to determining that the communication system is operating in an absence of AC power, performing auto-negotiation and increment advertised capabilities until link presence is detected, wherein the interface card locally selects the network interface power management state from the plurality of network interface power management states based at least in part on a volume of traffic received by the interface card, wherein said power consumption is scaled in relationship to an amount of traffic detected by said interface card; and
   a MAC interfacing with said PHY module through a physical connection.

27. The interface card of claim 26, wherein said PHY module comprises a single chip multi-sublayer PHY.

* * * * *